United States Patent
Jackson

(10) Patent No.: US 9,481,241 B2
(45) Date of Patent: Nov. 1, 2016

(54) COOLING SYSTEM FOR A VEHICLE SOLAR PANEL

(71) Applicant: FORD GLOBAL TECHNOLOGIES, LLC, Dearborn, MI (US)

(72) Inventor: Kenneth J. Jackson, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 46 days.

(21) Appl. No.: 14/501,662

(22) Filed: Sep. 30, 2014

(65) Prior Publication Data

US 2016/0089970 A1   Mar. 31, 2016

(51) Int. Cl.
*B60K 16/00* (2006.01)
*B60K 11/02* (2006.01)

(52) U.S. Cl.
CPC ............ *B60K 16/00* (2013.01); *B60K 11/02* (2013.01); *B60K 2016/003* (2013.01); *Y10S 903/904* (2013.01)

(58) Field of Classification Search
CPC ....... B60K 11/04; B60K 11/00; B60K 11/02; B60K 16/00; B60K 2016/003; B60K 8/00; B60K 8/003
USPC .......................................................... 180/2.2
See application file for complete search history.

(56) References Cited

U.S. PATENT DOCUMENTS

| | | | | |
|---|---|---|---|---|
| 3,585,812 A * | 6/1971 | Parker | B60H 1/32 | 62/180 |
| 4,307,575 A * | 12/1981 | Frosch | B60H 1/3201 | 62/148 |
| 4,658,597 A * | 4/1987 | Shum | B60H 1/00428 | 136/236.1 |
| 4,658,599 A * | 4/1987 | Kajiwara | B60H 1/00428 | 136/291 |
| 5,237,827 A * | 8/1993 | Tchernev | F03G 6/00 | 62/106 |
| 6,474,089 B1 * | 11/2002 | Chen | B60H 1/00428 | 62/235.1 |
| 6,662,572 B1 * | 12/2003 | Howard | B60H 1/00264 | 62/235.1 |
| 6,675,580 B2 * | 1/2004 | Ansley | F24J 2/36 | 126/624 |
| 6,808,450 B2 * | 10/2004 | Snow | B60H 1/00428 | 454/137 |
| 7,608,777 B2 * | 10/2009 | Bell | F01P 9/06 | 136/200 |
| 8,459,248 B2 * | 6/2013 | Milder | F24F 5/0046 | 126/570 |
| 8,648,249 B1 * | 2/2014 | West | F28D 15/00 | 136/246 |
| 9,266,405 B1 * | 2/2016 | Blanchard | B60H 1/00457 | |
| 9,300,169 B1 * | 3/2016 | Bardy | H02S 10/40 | |
| 9,321,352 B2 * | 4/2016 | Pierce | B60L 1/02 | |
| 9,327,597 B2 * | 5/2016 | Kimura | B60K 16/00 | |
| 2005/0074646 A1 * | 4/2005 | Rajashekara | H01M 8/04022 | 429/435 |
| 2006/0090787 A1 * | 5/2006 | Onvural | H01L 35/04 | 136/212 |
| 2008/0092541 A1 * | 4/2008 | Palmer | F03G 6/001 | 60/641.15 |

FOREIGN PATENT DOCUMENTS

DE   102009053915 A1   5/2011

* cited by examiner

*Primary Examiner* — James M Dolak
(74) *Attorney, Agent, or Firm* — David Kelley; Brooks Kushman P.C.

(57) ABSTRACT

A vehicle is provided. The vehicle includes an engine, a vehicle body panel, a photovoltaic unit attached to the vehicle body panel, and a cooling arrangement. The cooling arrangement includes a heat exchanger and a first cooling loop configured to accept heat from the engine and reject heat through the heat exchanger. The cooling arrangement also includes a second cooling loop configured to accept heat from the photovoltaic unit and reject heat through the heat exchanger.

20 Claims, 2 Drawing Sheets

COOLING SYSTEM FOR A VEHICLE SOLAR PANEL

TECHNICAL FIELD

The present disclosure relates to vehicles that have solar panels for capturing and utilizing solar energy.

BACKGROUND

It may be advantageous to concentrate solar energy directed onto solar panels of a vehicle in order to maximize battery charging. This, however, may lead to heating of the solar panels.

SUMMARY

A vehicle is provided. The vehicle includes an engine, a vehicle body panel, a photovoltaic unit attached to the vehicle body panel, and a cooling arrangement. The cooling arrangement includes a heat exchanger and a first cooling loop configured to accept heat from the engine and reject heat through the heat exchanger. The cooling arrangement also includes a second cooling loop configured to accept heat from the photovoltaic unit and reject heat through the heat exchanger.

A system for cooling a photovoltaic unit attached to a vehicle is provided. The system includes an engine cooling loop having a first heat exchanger and a secondary cooling loop having a second heat exchanger. The engine cooling loop is in fluid communication with the second cooling loop. The second heat exchanger transfers heat from the photovoltaic unit to a coolant flowing through the secondary cooling loop, the heat then is rejected through the first heat exchanger.

A system for cooling a photovoltaic unit attached to a vehicle is provided. The system includes a first cooling loop having a first heat exchanger. The first heat exchanger is configured to reject heat from a coolant. The system also includes a second cooling loop that is in fluid communication with the first cooling loop. The second cooling loop has a second heat exchanger that is configured to transfer heat from the photovoltaic unit to the coolant. A controller is programmed to control a pump to cycle the coolant through the first and second cooling loops when the photovoltaic unit requires cooling.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
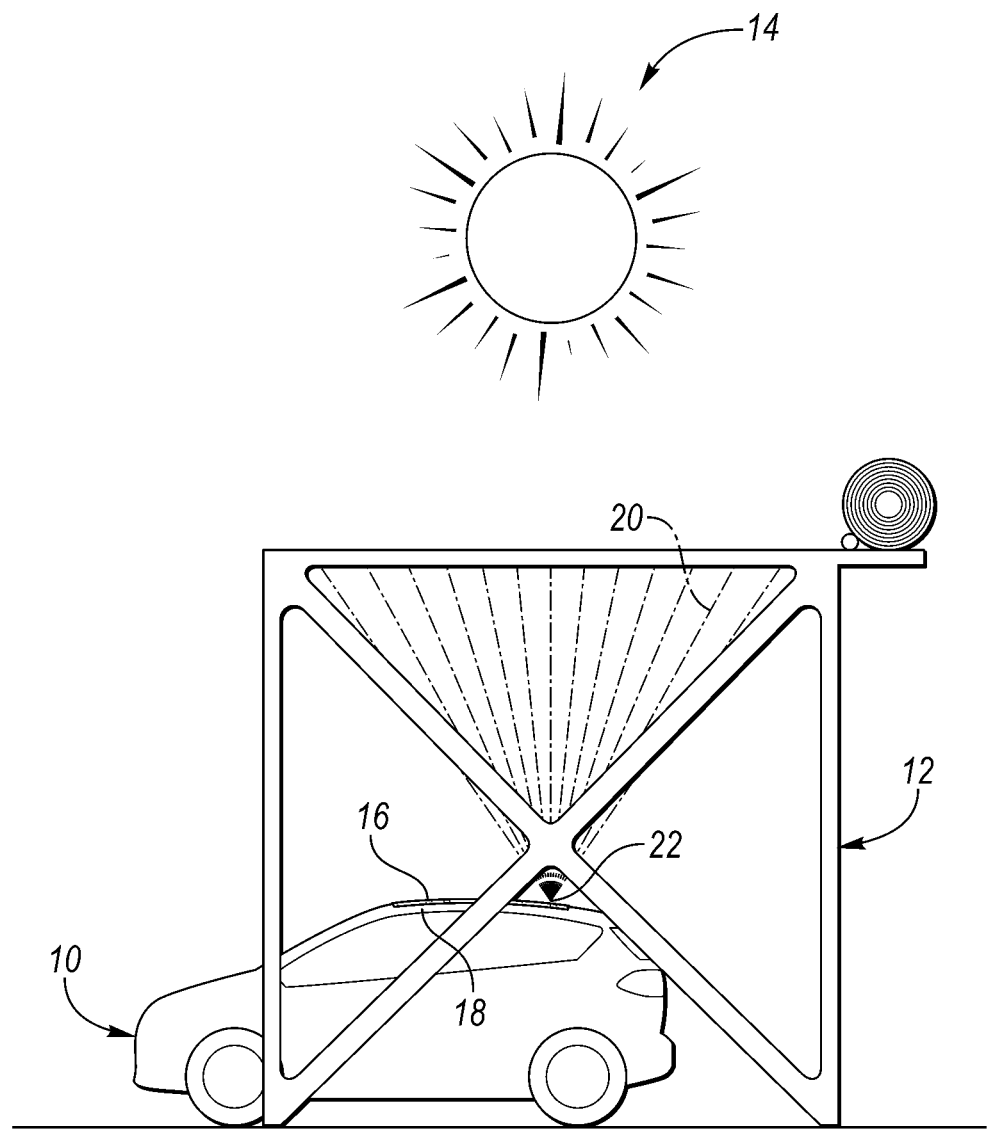
FIG. 1 illustrates a vehicle having a solar panel located under a solar concentrator in order to maximize battery charging.

Referring to FIG. 1, a vehicle 10 is illustrated. The vehicle 10 is parked below a solar concentrator 12. The solar concentrator 12 is configured to concentrate and focus the solar energy from the Sun 14 onto a solar panel (which also may be referred to as a solar array or photovoltaic unit) 16. The solar panel 16 may be attached to or part of a vehicle panel 18. Here, the solar panel is shown as part of a roof panel. However, the disclosure should not be construed as limited to solar panel panels that are attached to or part of vehicle panels, but should include any solar panel that is used in conjunction with a vehicle or vehicle system. The solar concentrator 12 is a device that may consist of a series of lenses that focus the solar rays 20 into a concentrated region or focal point 22 that is directed onto the solar panel 16.

Figure 2:
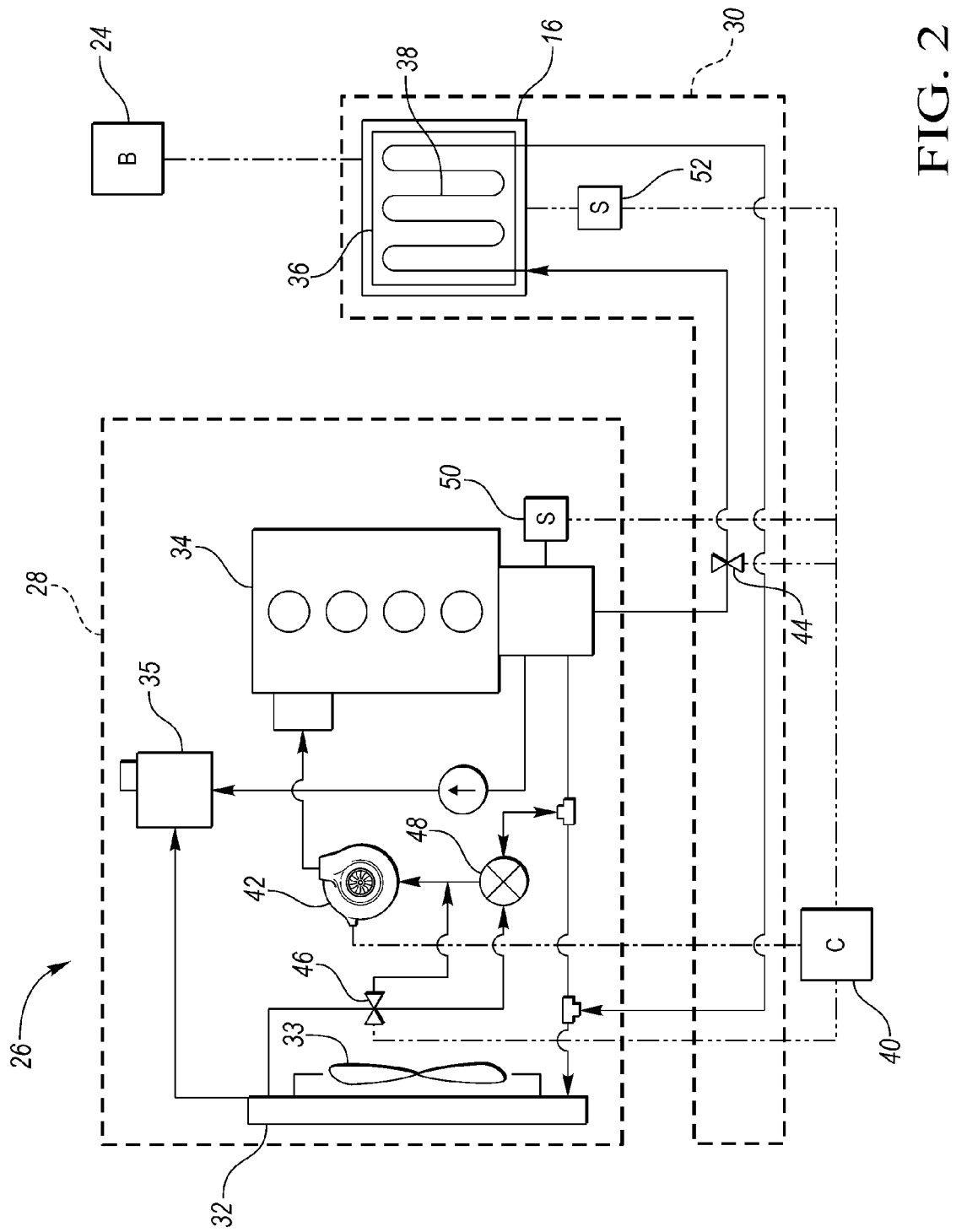
FIG. 2 illustrates a system for cooling a photovoltaic unit in a vehicle.

Referring to FIG. 2, the solar concentrator 12 is used in conjunction with the solar panel 16 to enable charging of a vehicle battery 24. The battery 24 may be any type of battery that is used in a vehicle including low voltage batteries that are used to power low voltage vehicle systems, and high voltage batteries that are used to power high voltage systems, such as traction batteries that are used to power electric machines that propel electric or hybrid vehicles. Concentrating solar energy may decrease the time required to charge the vehicle battery 24, but may also lead to an increase in thermal energy which could overheat the solar panel 16. Therefore, it may be advantageous to cool the solar panel 16 during times of battery 24 charging when the concentrated solar energy is being directed onto the solar panel 16.

With continued reference to FIG. 2, a system 26 for cooling a solar panel 16 is illustrated. The system 26 may also be referred to as a cooling arrangement. The system 26 includes a first cooling loop 28, a second or secondary cooling loop 30, and a first heat exchanger 32. The first cooling loop 28 and the second cooling loop 30 may be fluid communication with each other. Coolant flowing through the second cooling loop 30 may be configured to accept heat from the solar panel 16 and reject heat through the first heat exchanger 32.

The first cooling loop 28 may be an engine cooling system. Coolant flowing through the first cooling loop 28 may be configured to accept heat from an engine 34 of the vehicle 10 and then reject the heat from the engine 34 through the first heat exchanger 32. The first heat exchanger 32 may be a radiator in an engine cooling system. A blower fan 33 may be used to direct air across the first heat exchanger (or the coils of the radiator) in order to remove heat from the coolant flowing through the first heat exchanger 32.

The first cooling loop 28 may include a degas bottle/overflow tank 35. The degas bottle/overflow tank 35 provides a space for coolant to flow when the coolant has expanded due to pressure changes and/or thermal expansion. The degas bottle/overflow tank 35 is also where air in the first cooling loop 28 (or engine cooling system) is allowed to escape. The first cooling loop 28 is connected to the degas bottle/overflow tank 35 by a first connection at the engine outlet and a second connection at the high point of the first heat exchanger 32 (or radiator).

The second cooling loop 30 may include a second heat exchanger 36. The second heat exchanger 36 may be configured to transfer heat from the solar panel 16 to the coolant, the heat then being rejected from the coolant through the first heat exchanger 32. The second heat exchanger 36 may be a cold plate that is in contact with both the solar panel 16 and the second cooling loop 30. The second heat exchanger may include fluid channels 38 that are integrated into the second cooling loop 30.

The system 26 may also include a controller 40. The controller 40 may be programmed to control a pump 42 and a valving arrangement in the cooling loops.

While illustrated as one controller, the controller 40 may be part of a larger control system and may be controlled by various other controllers throughout the vehicle 10, such as a vehicle system controller (VSC). It should therefore be understood that the controller 40 and one or more other controllers can collectively be referred to as a "controller" that controls various actuators in response to signals from various sensors to control functions such as selecting or scheduling transmission shifts, etc. The controller 40 may include one or more microprocessors or central processing units (CPUs) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 40 in controlling the vehicle 10, engine 34, cooling system 26, etc.

The pump 42 may be an electric pump the cycles the coolant through the first and second cooling loops 28, 30. The pump may receive power from the battery 24, an auxiliary battery, a low voltage battery, the vehicle alternator, the solar panel 16, or any other available power source in the vehicle 10. The controller 40 may be programmed to operate the pump 42 to cycle the coolant in order to cool either the engine 34 or the solar panel 16 when either the engine 34 or solar panel 16 requires cooling.

The valving arrangement may include a first valve 44 that may be included in the second cooling loop 30. The first valve 44 being configured to isolate the second cooling loop 30 from the first cooling loop 28. The first valve 44 may consist of a two way valve that has an open position and a closed position, wherein the second cooling loop 30 is isolated from the first cooling loop 28 when the first valve 44 is in the closed position. The first valve 44 may be switched to the open position, allowing coolant to flow between the first and second cooling loops 28, 30, when the solar panel 16 requires cooling. The first valve 44 isolates the second cooling loop 30 from the first cooling loop 28 during periods of vehicle 10 operation when the coolant is being utilized to cool the engine 34. This may be required during times of vehicle 10 operation due to the increase in coolant temperature.

The valving arrangement may also include a second valve 46 that may be included in the first cooling loop 28. The second valve 46 being configured to bypass a thermostat 48. The thermostat 48 may be used to bypass a radiator (or first heat exchanger 32) in an engine cooling system (or first cooling loop 28) during periods where it is advantageous to bring the coolant up to the proper operating temperature quickly (some engine cooling systems may utilize a three way valve that is controlled by a system controller in place of a thermostat). The second valve 46 may consist of a three way valve that has a first position and a second position, wherein the thermostat is bypassed when the second valve 46 is in the second position. The second valve 46 may be switched to the first position, allowing coolant to flow through the thermostat 48. The second valve 46 bypasses the thermostat 48 during periods when the solar panel 16 requires cooling and the vehicle 10 is not operating. This ensures that the coolant that has accepted heat from the solar panel 16 does not bypass the first heat exchanger 32, where the heat in the coolant is rejected.

The controller 40 may be programmed to operate the pump 42 and valving arrangement to cool the solar panel 16 when the temperature of the solar panel 16 has reached a certain threshold. The temperature of the solar panel 16 may be detected with a temperature sensor 52 that relays the temperature information of the solar panel 16 back the controller 40.

The controller 40 may also be programmed to only operate the pump 42 and valving arrangement to cool the solar panel 16 when the temperature of the coolant is below a certain threshold. The temperature of the coolant may be detected with a temperature sensor 50 that relays the temperature information of the coolant back the controller 40. It may be necessary to ensure the coolant has sufficiently cooled, especially after the engine 34 has been running in an engine cooling system, before the system is capable of removing heat from the solar panel 16. Allowing the coolant to fall below a certain threshold may also necessary to prevent damage to the solar panel 16 when the coolant is too hot.

The controller 40 may also be programmed to operate the pump 42 and valving arrangement to cool the solar panel 16 when the temperature of the coolant in the second cooling loop 30 is above a certain threshold. The temperature of the coolant in the second cooling loop 30 may be detected by temperature sensor 52. Temperature sensor 52 then relays the temperature information of the coolant back the controller 40. It may be necessary to ensure the coolant has sufficiently cooled, and that the coolant temperature for the first coolant loop 28, detected by sensor 50 is cooler than the coolant in the second coolant loop 30 detected by sensor 52, before the system is capable of removing heat from the solar panel 16.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
   an engine;
   a vehicle body panel;
   a photovoltaic unit on the vehicle body panel; and
   a cooling arrangement including a heat exchanger, a first cooling loop accepting heat from the engine and rejecting heat through the heat exchanger when a coolant flows therethrough, and a second cooling loop accepting heat from the photovoltaic unit and rejecting heat through the heat exchanger when the coolant flows therethrough.

2. The vehicle of claim 1, wherein the cooling arrangement includes a cold plate that is in contact with the photovoltaic unit and the second cooling loop and wherein the cold plate transfers heat from the photovoltaic unit to the coolant when the coolant is flowing through the cooling loops.

3. The vehicle of claim 2, wherein the cold plate includes fluid channels that are integrated into the second cooling loop.

4. The vehicle of claim 1, wherein the heat exchanger is a radiator.

5. The vehicle of claim 1, wherein a controller is programmed to adjust the valves of a valving arrangement in the cooling loops between opened and closed positions.

6. The vehicle of claim 5, wherein the valving arrangement in the cooling loops isolates the second cooling loop from the first cooling loop when the valves are adjusted to a specified arrangement of opened and closed positions.

7. The vehicle of claim 5, wherein the valving arrangement bypasses a thermostat in the first cooling loop when the valves are adjusted to a specified arrangement of opened and closed positions.

8. The vehicle of claim 1, wherein an electric pump cycles a coolant through the cooling loops.

9. A system for cooling a photovoltaic unit attached to a vehicle comprising:
   an engine cooling loop having a first heat exchanger; and
   a secondary cooling loop, in fluid communication with the engine cooling loop, having a second heat exchanger, wherein the second heat exchanger transfers heat from the photovoltaic unit to a coolant flowing through the secondary cooling loop, the heat then being rejected through the first heat exchanger.

10. The system of claim 9, wherein the second heat exchanger is a cold plate.

11. The system of claim 9, wherein a valving arrangement in the cooling loops isolates the secondary cooling loop from the engine cooling loop when valves in the valving arrangement are adjusted to a specified arrangement of opened and closed positions.

12. The system of claim 9, wherein a valving arrangement bypasses a thermostat in the engine cooling loop when valves in the valving arrangement are adjusted to a specified arrangement of opened and closed positions.

13. The system of claim 9, wherein an electric pump cycles the coolant through the engine cooling loop and the secondary cooling loop.

14. A system for cooling a photovoltaic unit attached to a vehicle comprising:
   a first cooling loop having a first heat exchanger that rejects heat from a coolant when the coolant flows therethrough;
   a second cooling loop in fluid communication with the first cooling loop and having a second heat exchanger that transfers heat from the photovoltaic unit to the coolant when the coolant flows therethrough; and
   a controller programmed to control a pump to cycle the coolant through the first and second cooling loops when the photovoltaic unit requires cooling.

15. The system of claim 14, wherein the controller is further programmed to control a first valve located in the second cooling loop and wherein the first valve is switched from a closed position to an open position when the photovoltaic unit requires cooling.

16. The system of claim 14, wherein the controller is programmed to control the pump to cycle the coolant through the first and second cooling loops when the temperature of the photovoltaic unit reaches a predetermined threshold.

17. The system of claim 16, wherein a sensor measures the temperature of the photovoltaic unit.

18. The system of claim 15, wherein the controller is further programmed to control a second valve located in the first cooling loop and wherein the second valve is switched from a first position to a second position in order to bypass a thermostat located in the first cooling loop when the photovoltaic unit requires cooling.

19. The system of claim 14, wherein the controller is programmed to control the pump to cycle the coolant through the first and second cooling loops when the temperature of the coolant is below a predetermined threshold.

20. The system of claim 19, wherein a sensor measures the temperature of the coolant.

* * * * *